United States Patent [19]

Panetta

[11] Patent Number: 5,735,029
[45] Date of Patent: Apr. 7, 1998

US005735029A

[54] FLEXIBLE ARBOR MILL MACHINE

[75] Inventor: Michael D. Panetta, Royal Oak, Mich.

[73] Assignee: Western Atlas, Inc., Hebron, Ky.

[21] Appl. No.: 764,328

[22] Filed: Dec. 12, 1996

[51] Int. Cl.$^6$ .................................. B23Q 5/00; B23C 3/00
[52] U.S. Cl. .................................. 29/40; 409/203; 483/31
[58] Field of Search .................................. 29/40, 33 J, 39;
409/203, 145, 162, 217, 163, 164, 213,
230; 451/362, 62; 483/30, 31, 32, 33, 55,
13; 408/35; 83/665; 144/374, 376

[56] References Cited

U.S. PATENT DOCUMENTS

| | | | |
|---|---|---|---|
| 3,884,590 | 5/1975 | Skrentner et al. | 408/8 |
| 4,154,555 | 5/1979 | Skrentner | 408/25 |
| 4,535,527 | 8/1985 | Fischer et al. | 483/55 |
| 4,573,840 | 3/1986 | Skrentner | 409/200 |
| 4,847,978 | 7/1989 | Klein | 29/568 |
| 4,995,160 | 2/1991 | Schmid | 483/31 |
| 5,199,158 | 4/1993 | Wioskowski | 29/563 |
| 5,221,165 | 6/1993 | Goszczynski | 408/1 R |
| 5,355,633 | 10/1994 | Ishikana et al. | 451/62 X |
| 5,383,261 | 1/1995 | Yamamoto et al. | 29/40 |
| 5,637,068 | 6/1997 | Chambers | 483/30 X |

FOREIGN PATENT DOCUMENTS

| | | | |
|---|---|---|---|
| 89235 | 4/1988 | Japan | 483/30 |
| 2019752 | 11/1979 | United Kingdom | 29/39 |

*Primary Examiner*—William R. Briggs
*Attorney, Agent, or Firm*—Barnes, Kisselle, Raisch, Choate, Whittemore & Hulbert, P.C.

[57] ABSTRACT

An arbor mill machine which performs multiple machining operations on a workpiece in one work station. A rotatable tool turret carries a plurality of arbor cutting tools each of which can be indexed into the work station for performing a machining operation on a workpiece carried by a slide which advances the workpiece into the arbor tool and retracts the workpiece from it. A single drive spindle carried by a slide is advanced to releasably engage and drive the arbor tool in the work station to machine the workpiece and is retracted to release and disengage the arbor tool so that it can be removed from the work station when the turret is indexed to advance another arbor tool into the work station to perform another machining operation on the workpiece. The turret is releasably locked to prevent it from rotating while an arbor tool is machining a workpiece and is released between machining operations to permit indexing of the turret to position another arbor tool in the work station. Preferably the machine is cycled and controlled by a programmable controller or a digital computer which may be programmed for machining a wide variety of different workpieces.

17 Claims, 3 Drawing Sheets

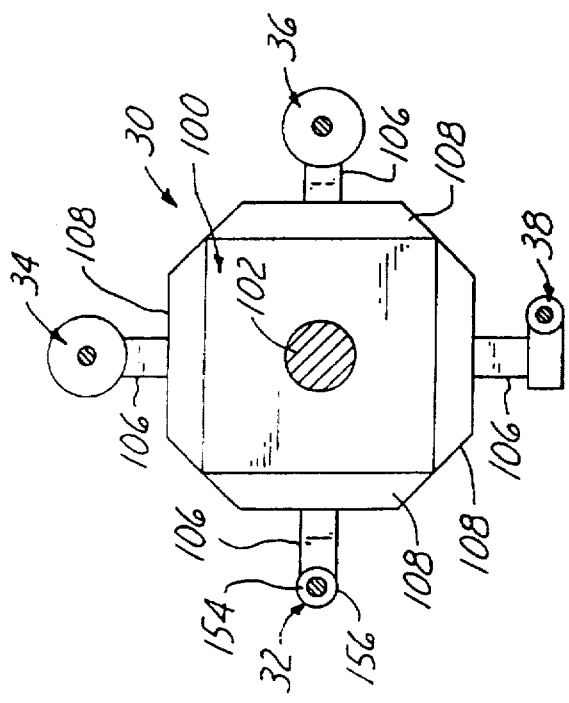
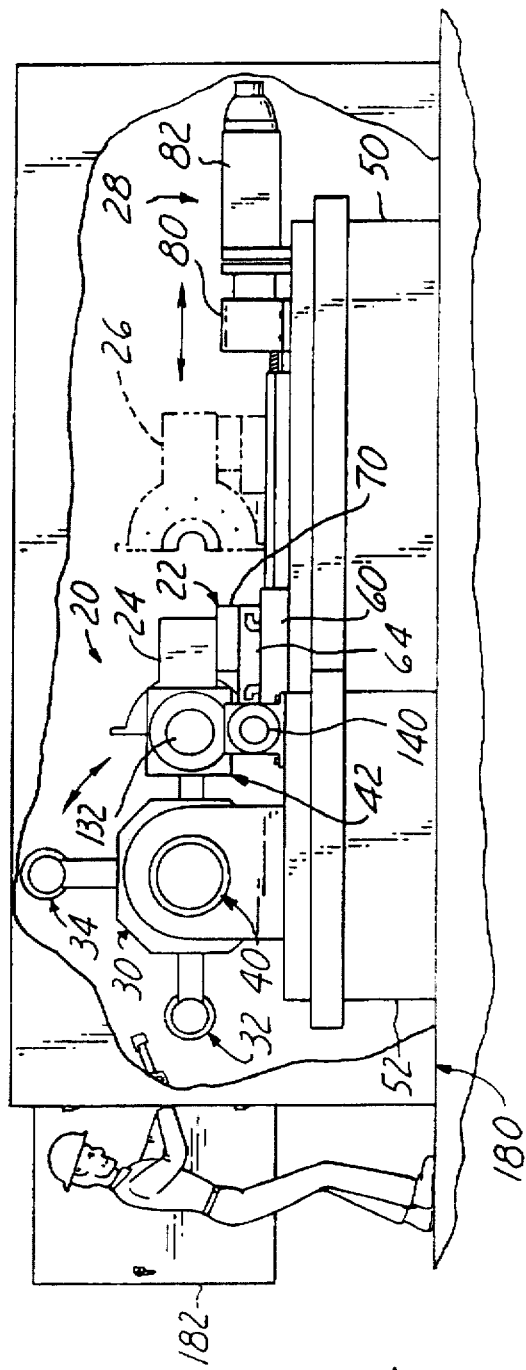

5,735,029

FLEXIBLE ARBOR MILL MACHINE

FIELD OF THE INVENTION

This invention relates to arbor mill machines for performing machining operations and more particularly, to a flexible arbor mill machine for changing and driving machine tools at a work station.

BACKGROUND OF THE INVENTION

Typically, an arbor mill machining operation requires a dedicated machine set-up with adequate tool supports for each machining operation. This has been necessary to achieve accurate machining or milling in a high volume production environment. A work station for high volume production lines is typically designed to perform one operation on a single complex part having little or no product variation from one model year to the next. Changing tools at a particular arbor mill station to accommodate a different part or a different machine operation is done by manually replacing the tools at the station in between production shifts with the work station shut down. While the manufacturing line is shut down, a tool change is performed at all arbor mill stations necessary to accommodate a particular product variation. During the next shift, each work station on the production line is set up to perform a dedicated operation on the changed product.

Cost reduction on these current production lines is achieved by using hydraulic axis drives for moving the workpiece and machine components, single speed spindle motors, and controlling a series of work stations with a programmable logic controller. However, product changeovers still require a time consuming and costly process of re-engineering and re-tooling all necessary work stations in the production line.

Due to frequently changing manufacturing and consumer demands, a dedicated single work station arbor mill machine for performing one machining operation is far less effective in providing a variety of quality products at a competitive cost in a high volume manufacturing environment. Today's manufacturing environment requires that machine tool operations, even the most dedicated operations such as arbor milling, be flexible, of modular construction and adaptable to product and volume variations with virtually no machine down time, significantly less tooling changeover time and reduced cost. What is needed is an arbor mill work station capable of performing more than one operation at a single work station and producing a high quality result at a reasonable cost while requiring significantly less time and labor for tooling changeovers.

SUMMARY OF THE INVENTION

A flexible arbor mill machine capable of carrying multiple machine tools and changing from one tool to another for performing a number of machining operations on a workpiece at one work station while maintaining the close machining tolerances and high quality standards of the prior dedicated single operation arbor mill machines. The machine has a workpiece mounting platen slidably carried on a base for releasably receiving a workpiece thereon. A drive is operably connected to the platen for moving the workpiece and the platen relative to the base. A tooling turret is mounted on the base and has a plurality of cutting tools releasably carried on it. The tooling turret may be rotated on its axis so that any one of the tools as desired is positioned adjacent the workpiece for performing a machining operation on the workpiece while the other tools are spaced from the workpiece. An index motor is connected to the turret for rotating the turret to position any one of the tools carried thereon adjacent the workpiece to perform the desired machining operation. A tool driver is carried by the base and may be releasably coupled to the tool positioned adjacent the workpiece for driving the tool.

Objects, features and advantages of this invention are to provide a single station multiple machining operation arbor mill machine which is capable of carrying and driving two or more cutting tools, is capable of performing more than one machining operation on the workpiece at the same station, reduces the number of arbor mill work stations in a production line reduces the space required for a full production line, reduces the cost and time investment necessary to set up a production line, significantly reduces the production line down time during a tooling changeover, provides a highly accurate and repeatable machining capability provides adequate tool supports for each tool, can be operated by a CNC controller, is highly flexible reliable, rugged, durable and of relatively simple design and economical manufacture and assembly.

BRIEF DESCRIPTION OF THE DRAWINGS

These and other objects features and advantages of this invention will be apparent from the following detailed description of the preferred embodiment and best mode, appended claims and accompanying drawings in which:

FIG. 2 is a fragmentary sectional view of the tooling turret of the arbor mill machine taken along line 2—2 of FIG. 1;

FIG. 3 is a side view of the arbor mill machine of FIG. 1 housed in a work room with a side wall cut away and the tooling changeover access door open;

DETAILED DESCRIPTION OF THE PREFERRED EMBODIMENT

Figure 1:
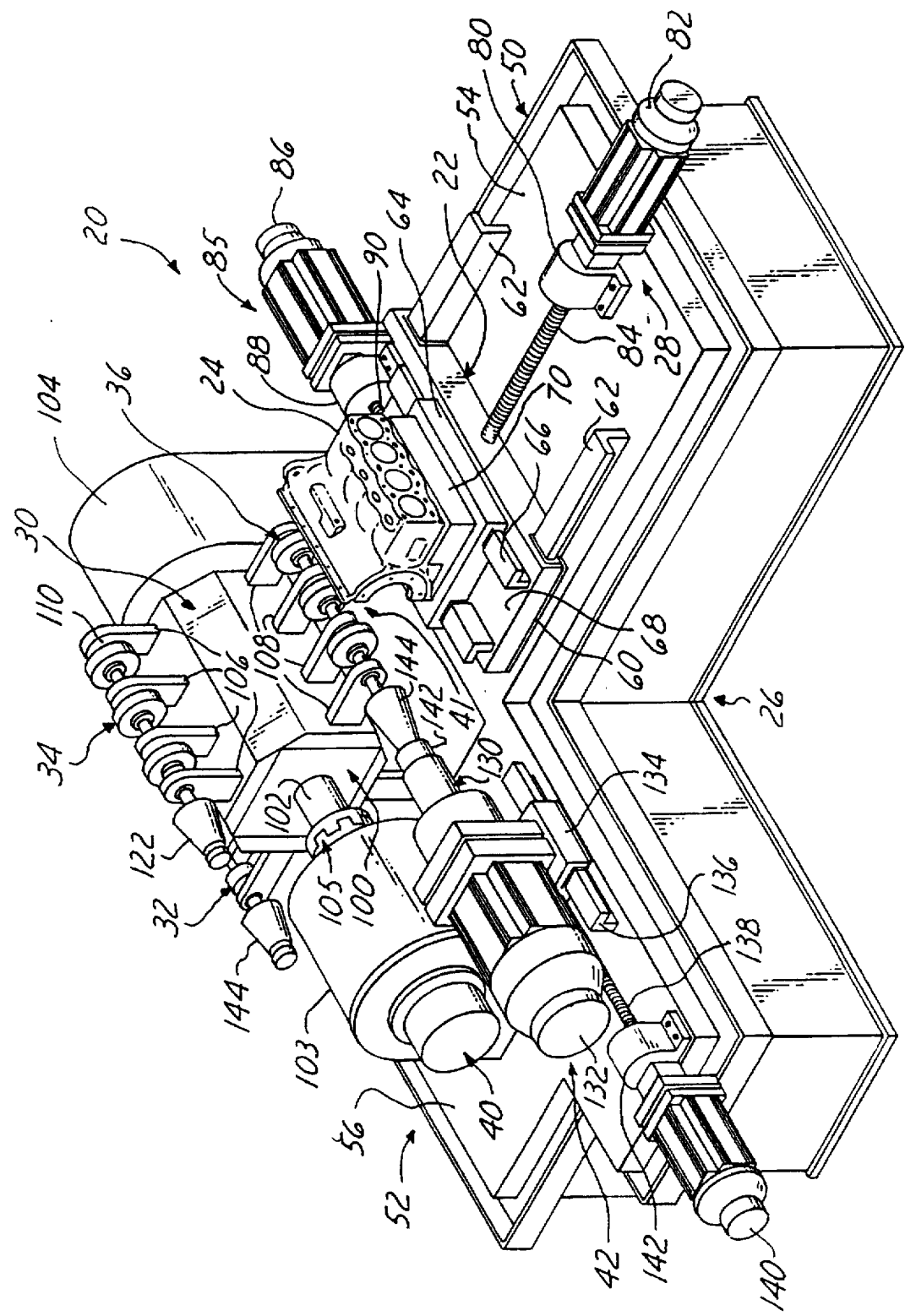
FIG. 1 is an elevational perspective view of an arbor mill machine embodying the invention.

Referring in more detail to the drawings, FIG. 1 illustrates a flexible arbor mill machine 20 embodying this invention with a platen 22 carrying a workpiece 24 and slidably received on a base 26 for being advanced and retracted by a drive 28 relative to a tool turret 30 with a plurality of cutting tool arbor 32, 34, 36 and 38 journalled and supported on the turret. The turret is indexed by a motor 40 and the tool arbor adjacent the workpiece is releasably coupled with and driven by a tool driver assembly 42.

The base 22 may be constructed and arranged in any number of configurations and is preferably of a modular construction so that it is adaptable to a number of machine tool work station set-ups. Preferably the base 22 has a workpiece support module 50 and a tooling station module 52 positioned adjacent one another. The workpiece module 50 has a top plate 54 which carries the workpiece platen 22 and the platen drive 28. The tooling station module 52 has a top plate 56 preferably disposed coplanar with the top plate 54 of the base module 50. The tooling turret 30, index motor 40 and tool driver 42 are all carried on the top plate 56 and arranged so that the tool driver may be coupled with one of the machine tools carried by the tooling turret when the tool is positioned in the machining area 41 adjacent the workpiece 24. The base modules 50 and 52 are preferably of a rigid construction and secured together so that the movements and interrelation of all components of the milling machine 20 may be controlled with a high degree of accuracy.

The platen assembly 22 controls the radial or transverse spacing between the workpiece 24 and the adjacent tool in the station area 41 and the relative axial or longitudinal positioning of the tool and workpiece. The platen assembly 22 has a lower carriage 60 slidably carried by a pair of parallel and spaced apart linear lower guide rails 62 mounted on the top plate 54 of the workpiece module 50. An upper slide 64 is carried by a pair of parallel spaced apart linear upper guide rails 66 mounted on the upper face 68 of lower carriage 60. The movement of the lower carriage 60 preferably advances and retracts the workpiece 24 toward and away from the cutting tool in the machining work station 41. The upper slide 64 preferably moves the workpiece 24 longitudinally or in a direction parallel to the axis of the arbor cutting tool positioned in the work station 41. The lower carriage 60 moves on an axis conveniently termed herein as the Z-axis and the upper slide 64 moves along an axis conveniently termed herein as the X-axis, preferably perpendicular to the Z-axis of movement.

The workpiece 24 is releasably secured to a mounting fixture 70 which is attached to the upper side 64 for movement therewith. The fixture accurately positions the workpiece 24 at the proper height relative to the adjacent machine tool in the work station 41 in view of the nature of the workpiece and the machining to be performed. For example, for machining the crankshaft journal blocks of the engine crankcase workpiece 24 shown in FIGS. 1 and 3, the fixture locates and secures the engine block so that the common axis of its crankshaft journals is parallel to and at the same vertical height as the axis of rotation of the arbor tool 36 when in the station 41 for machining the journal surfaces. The lower carriage 60, upper slide 64 fixture 70 and the guide rails 62 and 66 are all essentially of rigid construction with virtually no structural deflection thereby providing highly accurate positioning and locating capability of the workpiece relative to the machine tools.

The carriage is moved along a Z-axis by a threaded shaft 84 driven through a speed reducer gear box 80 mounted on the base module 50 by a reversible electric stepper motor 82. The threaded shaft 84 is received in a complimentarily threaded bore in the lower carriage 60. Rotation of the threaded shaft 84 advances or retracts the lower drive 28 along the Z-axis depending on the direction of rotation of the shaft by the stepper motor 82. Preferably, the Z-axis is perpendicular to the axis of rotation of the arbor tool received in the work station 41.

The upper slide is advanced and retracted along an X-axis by a drive assembly 85 with a threaded shaft 90 driven by an electric reversable stepper motor 86 through a speed reducer gear box 88 mounted on the lower carriage 60. The threaded shaft is received in a complimentarily threaded bore in the upper slide which is advanced and retracted along the X-axis by rotation of the shaft in opposite directions by the stepper motor 86. Preferably the X-axis is perpendicular to the Z-axis and parallel to the axis of rotation of the arbor tool in the work station 41.

The tooling turret assembly 30 has a turret head 100 fixed to a central shaft 102 which extends axially outwardly from both ends of the head and is journalled for rotation in and supported by a pair of trunnions 103 & 104 fixed to the base module 52. The turret head 100 is rotatably indexed about the axis of the shaft 102 by a stepper motor 40 mounted in trunnion 103. The turret head is locked in an indexed position and released for rotation by the cooperation of a pair of curvic coupling rings 105 one of which is secured to shaft 102 for rotation in unison with the turret and the other of which is restrained so it cannot rotate and is axially movable to a first position in which the curvic couplings are in firm locking engagement to prevent movement of the turret head and to a second displaced position in which the couplings are disengaged and spaced apart to permit the turret head to be rotated. Preferably the curvic coupling is advanced and retracted to its first and second positions by a reversible electric drive motor or a pneumatic cylinder assembly (not shown). The turret head is positioned by the trunnions 103 & 104 at a sufficient height above the upper plate 56 of the base module 50 to provide adequate clearance for all the tools carried by the turret head to pass between them as the tools are indexed or rotated by the motor 40.

Preferably, each of the arbor tools 32, 34, 36 and 38 is carried by and journalled for rotation in a series of supports 106. Preferably for each tool its associated supports 106 are secured to a carrier plate 108 releasably secured to the turret head 100. Each tool is releasably journalled in a bearing or bushing 110 adjacent the free end of its associated support 106 to releasably retain the arbor tool to permit it to be changed or removed and replaced. Preferably the bushings 110 are all of the same size or interchangeable so that they can receive and journal a variety of different tools. The number of supports 106 necessary for a given machining operation will depend on the construction of the arbor tool and the load to which it is subjected during machining but must be sufficient so that when each arbor tool is machining a workpiece it will undergo essentially no lateral deflection.

When in the work station 41 each machine tool is releasably coupled to and driven by the tool driver 42. Tool driver has a spindle 130 driven by an electric motor 132 and carried by a slide 134 received on a pair of guide rails 136 secured to the top 56 of the base module 52. The slide 134 and hence the spindle is advanced and retracted relative to the tool in the work station 41 by rotation in opposite directions of a threaded shaft 38 driven by an electric reversible stepper motor 140 through a speed reducer gear box 142 mounted on the base module 52. The shaft 138 is received in a complementarily threaded bore in the slide 134. The axis of rotation of the spindle 130 is coaxial with the shank 144 of the axis of the arbor tool received in the work station 41 and the spindle and slide 34 are advanced and retracted along an axis X' which is preferably essentially perpendicular to the Z-axis and parallel to the X-axis. Preferably, the axes X and X' are also parallel to the axis of rotation of the turret head 100 and this turret axis is preferably also perpendicular to the Z-axis. Preferably the spindle drive motor 132 is a high horse power and relatively low RPM variable speed motor. When the spindle is in its advanced position, it is releasably coupled to the arbor tool in the work station 41 by a spindle adapter 142 which slidably receives a tapered shank 144 of the arbor tool and is pulled into firm locking engagement by a draw bar mechanism in the spindle with gripping fingers (not shown) which engage in the groove 146 in the tapered shank 144. The draw bar is actuated by a pneumatic cylinder not shown.

Figures 6, 7:
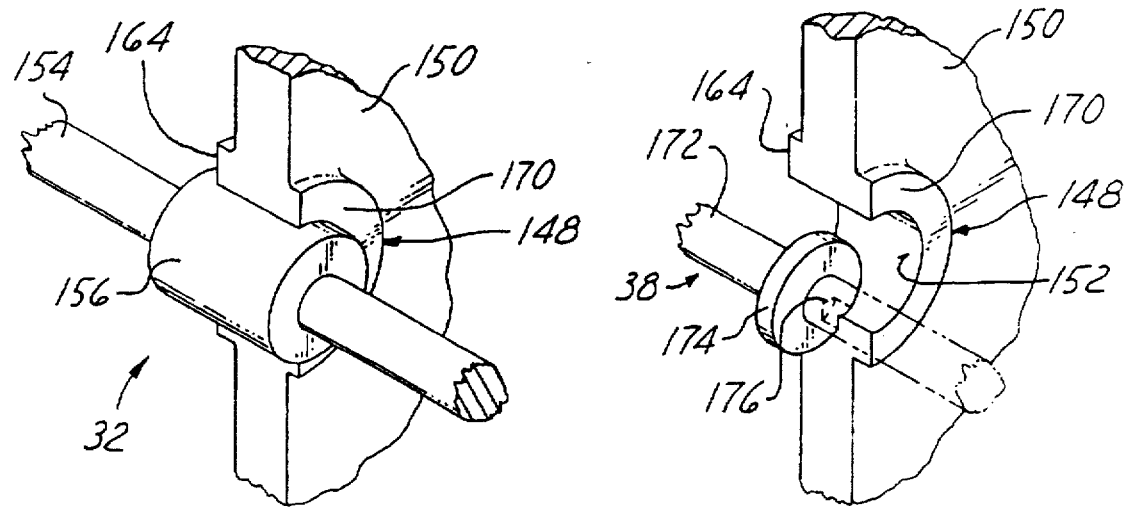
FIG. 6 is a fragmentary perspective view of a machine tool performing a milling operation on a bearing surface of the journal of the bulkhead of FIG. 4.
FIG. 7 is a fragmentary perspective view of a machine tool performing a slitting operating forming a bearing locator notch in the journal of the bulkhead of FIG. 4.

The construction and arrangement of each arbor cutting tool is dependent on the specific workpiece which is illustrated as an engine block and the specific machining operations to be formed which by way of example are the machining of various surfaces of the crankshaft bearing journal 148 of each bulkhead 150 of the engine block. As shown in FIGS. 1, 2 and 6, arbor tool 32 has a central arbor shaft 154 with a tapered shank 144 at one end and a plurality of axially spaced apart milling cutters 156 mounted on the shaft for each machining a journal bearing surface 152 of one of the journals 148 of the bulkheads 150 of the engine block. Preferably the arbor tool 32 has a separate cutter 156 for the journal bearing surface 152 of each bulkhead of the engine.

Figures 4, 5:
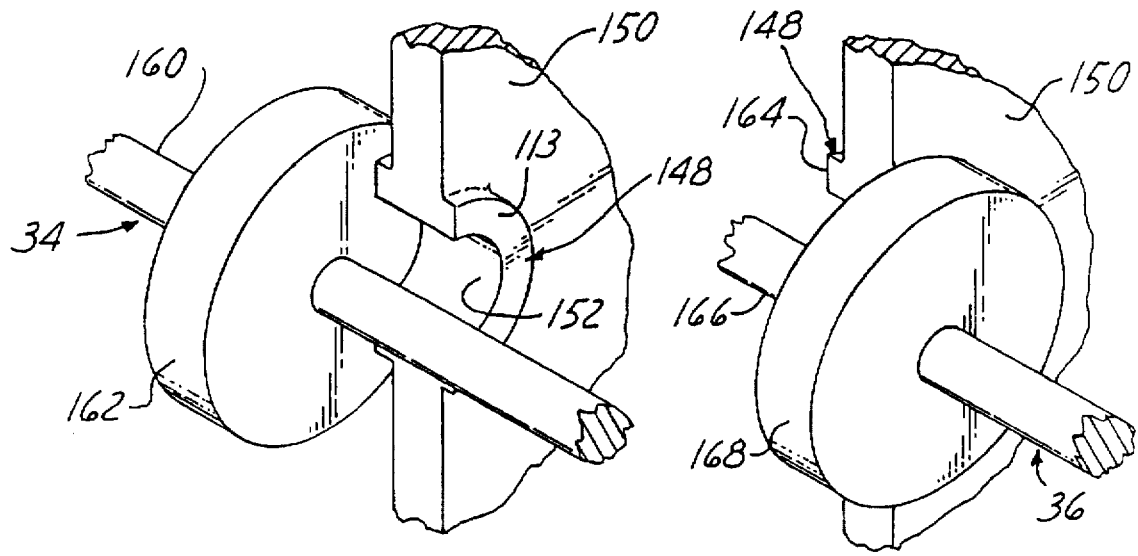
FIG. 4 is a fragmentary perspective view of a machine tool performing a milling operation on a thrust bearing journal side surface of an exemplary workpiece depicted as an engine block crankshaft bulkhead.
FIG. 5 is a fragmentary perspective view of a machine tool performing a milling operation on the other thrust bearing journal side surface of the bulkhead of FIG. 4.

As shown in FIGS. 1, 2 and 4 the arbor tool 34 has a central arbor shaft 160 with a tapered shank 144 at one end and a plurality of axially spaced apart side face milling cutters 162 mounted on the shaft for each machining one side face 164 of a separate one of the journals 148 of the bulkheads 152 of the engine. As shown in FIGS. 1, 2 and 5 the arbor tool 36 has a central arbor shaft 166 with a tapered shank 144 at one and a plurality of axially spaced apart milling cutters 168 mounted on the shaft for machining the other side face 170 of a separate one of the journals 148 of the engine bulkheads 150.

As shown in FIGS. 1, 2 & 7, the arbor tool 38 has a central shaft 172 with a plurality of milling cutters 174 axially spaced thereon for each machining a bearing retaining notch 176 in a separate one of the journals of the bulkheads 150 of the engine. For the tool 38 the axis of its arbor shaft 172 is off-set with respect to the axis of the spindle 132 and hence the axis of its tapered coupling shank 144 is off-set from its axis arbor shaft 172. Thus, the shank 144 and the arbor shaft 172 are operably coupled together such as by a pair of meshed gears with one fixed to the tapered shank and the other fixed to the shaft.

For machining a workpiece 24, it is positioned and secured in the fixture 70 and the appropriate arbor tools are mounted on the turret head 100. For machining the crankshaft bearing journal surfaces and side faces of the engine block, the arbor tools 32, 34, 36 and 38 are each mounted on the support 106 of a separate tool receiving face of the turret head. For performing the first operation of machining the bearing surfaces 152, the actuator cylinder is energized to disengage the curvic coupling 105 and the turret head 100 is indexed by energizing the motor 40 to position the arbor tool 32 in the work station 41 while the workpiece 26 and the spindle 130 are retracted to provide clearance for the rotating tools and turret. When indexing is complete the actuator is energized to firmly engage the curvic couplings 105 and thereby lock the turret head 100 in position to prevent rotation thereof during the machining operation. If needed to align the journals 170 with the cutters 156 the upper slide 164 is advanced or retracted along the X-axis by energizing the stepper motor 86. The spindle 130 of the drive assembly 42 is advanced towards the tool by energizing the stepper motor 140. The adapter 142 seated in the spindle receives the tapered shank 144 of the tool 32 and the draw bar mechanism is actuated to engage the shank 144 and draw it into firm connected relation with the spindle for rotation in unison therewith.

To machine bearing surfaces 152, the drive motor 132 is energized to rotate the cutters 156 of the arbor tool 32 and the workpiece is advanced into the cutters by energizing the stepper motor 82 to advance the carriage 60 and hence the workpiece into engagement with the rotating cutters 152 to essentially simultaneously machine the bearing surfaces 152 in all of the bulkheads 150. When this machining is complete, the workpiece is retracted from the cutter by energizing the stepper motor 82 to rotate the lead screw 84 in the opposite direction thereby retracting the carriage 60 and the workpiece. To stop rotation of the arbor tool 32 the spindle drive motor 132 is turned off or de-energized and the draw bar is actuated to release the tapered shank 144 and the spindle drive assembly is retracted and disengaged from the tool shank by energizing the stepper motor 140 to rotate the lead screw 138 in the opposite direction.

For machining the side face 164 of the bearing journals of the bulkhead, the arbor tool 34 is advanced into the work station 41 by the turret assembly 100. The curvic couplings 105 are disengaged by energizing the actuating cylinder and the servo motor 40 is energized to rotate the turret block 100 to advance or index the arbor tool 34 into the work station 41 whereupon the servo motor is de-energized and the curvic couplings are firmly engaged to lock the turret against further rotation to prevent its movement during machining of the workpiece. The spindle drive 40 is advanced by energizing the servo motor 140 to engage the adapter 142 with the tapered shank 144 of the arbor tool 34 and the drive motor 132 is energized to rotate the tool. If needed to align the cutters 162 with the first side face 164 of the journals for the proper depth of cut for removing the desired amount of material, the upper slide 70 and hence the workpiece in advanced or retracted along the X-axis by energizing the stepper motor 86. After being properly aligned with the cutters 162 of the tool 34 the workpiece 24 is advanced or fed into the cutters by energizing the stepper motor 82 to advance the carriage 64 along the Z-axis to substantially simultaneously machine the first side face 162 of the journals of all of the bulkheads by the rotating cutters 162. After this machining is finished the drive motor 132 is turned off and the spindle 130 is disengaged and retracted from the tool by releasing the draw bar mechanism and retracting the spindle by energizing the stepper motor 140.

For machining the second side face 170 of the journals, the arbor tool 36 is advanced into the work station 41 by releasing and disengaging the curvic couplings 105, energizing the servo motor 40 to index or advance the turret to move the arbor tool 36 in the work stations 41, and then de-energizing the motor 41 and firmly engaging the curvic couplings to lock the turret and prevent it from moving while the workpiece is being machined. The spindle assembly 42 is advanced to connect the spindle 130 with the tapered shank 144 of the arbor tool 36 and drive motor 42 is energized to rotate the spindle and the cutting tool. If needed to align the cutters 168 with the second face 170 of the journals for the proper depth of cut, the workpiece is advanced or retracted along the X-axis by energizing the stepper motor 86 to move the slide 70. After being properly aligned the workpiece is advanced or fed into the cutters 168 by energizing stepper motor 82 to advance the carriage 64 along the Z-axis to substantially simultaneously machine the second side faces 170 of all the journals of the bulkheads by the rotating cutters 168. After this machining is completed the workpiece is retracted by reversing the direction of rotation of the servo motor 82. The spindle drive motor 132 is turned off and the spindle is released and retracted from the arbor tool 36 by actuating the draw bar mechanism to release the shank 144 of the tool and energizing the stepper motor 140 to retract the spindle assembly 42.

For machining the bearing locator notches 176 the arbor tool 38 is advanced into the work station 41 by releasing and disengaging the curvic couplings 105 and energizing the stepper motor 40 to advance or index the turret head 100 to dispose the arbor tool 38 in the work station whereupon the motor 40 is de-energized and the turret couplings are firmly engaged to lock the turret and prevent it from moving during machining of the workpiece. If needed to align the tool cutters 174 for machining the slots 176 in the journals of the bulkheads, the workpiece is advanced or retracted among the X-axis by energizing the stepper motor 86. After they are properly aligned the workpiece is advanced along the Z-axis by energizing stepper motor 82 to substantially simultaneously machine the slots 176 in all the journals by the rotating cutters 174 driven by the spindle motor 132. After this machining is completed the workpiece 24 is retracted by reversing the direction of rotation of the stepper motor 82 to disengage and remove workpiece from the cutters. The spindle drive motor 132 is stopped and the spindle is released and disengaged from the shank 144 of the arbor tool 38 by energizing the draw bar release mechanism and the stepper motor 140 to retract the spindle assembly 42.

After the machining is completed and the workpiece is retracted, it is released and removed from the fixture 70 and another workpiece to be machined is positioned and secured in the fixture. Thereafter another cycle of machining operations of the machine 20 is initiated.

As an alternative to aligning the tool cutters and the workpiece 24 by moving the workpiece 24 along the X-axis, the tool supports 106 can be constructed to permit the arbor tools to be moved axially relative to the turret head 100 and the workpiece by the spindle assembly 42 being moved along the X'-axis in unison with the tool to which it is coupled by the stepper motor 140.

FIG. 3 illustrates the flexible milling machine 20 received in a suitable closure or room 180 which has an access door 182 for permitting repair and or manual tool changes on the turret head 100 while machining operations are performed on a workpiece.

The milling machine is preferably controlled and cycled by a CNC programmable controller or a digital computer which can be programmed to coordinate, control and cycle all of the operations of the arbor mill machine 20. Suitable sensors such as resolvers may be used with all of the stepper motors to provide a suitable signal to the controller or computer of the position of their associated slides 60, 70, 134 and turret head 100 for use in cycling, controlling and monitoring the operations of the machine. The computer or programmable controller may store and perform a number of programs for different parts to machine each of the parts as needed within the working range of the flexible milling machine and associated arbor tools for each different part to be machined. A suitable programmable controller or computer and programming for automating the operation of the milling machine will be readily apparent to skilled persons and will not be described in detail herein. If desired an automatic tool changer can be associated with the turret to facilitate tool changing for the machining of different parts.

What is claimed is:

1. An arbor mill machine for performing at least two machining operations at one work station on a workpiece comprising, a base, a tool turret carried by said base for releasably carrying, supporting and journalling at least two separate arbor cutting tools, said arbor tools comprising multiple cutters on a common arbor, the tool turret being rotatable on its axis so that any one of the arbor tools thereon can be positioned in a work station for engagement with a workpiece to perform a machining operation on the workpiece while all of the other arbor tools carried by the turret are spaced from the workpiece, a first drive operably connected with the turret for rotating the turret to position any one of the arbor tools carried thereby in the work station for performing a machining operation on a workpiece, a second drive carried by the base and having a releasable coupling for operably connecting the drive with the arbor tool positioned in the work station by the turret for driving such arbor tool for performing a machining operation on a workpiece, a slide carried by the base for releasably carrying a workpiece thereon, and a third drive operably connected with the slide for advancing and retracting the slide relative to the arbor tool in the work station for moving the workpiece carried by the slide into and out of engagement with the arbor tool in the work station for machining the workpiece.

2. The machine of claim 1 wherein each of the arbor tools is constructed to perform a different machining operation on the workpiece.

3. The machine of claim 1 wherein at least three arbor tools are releasably carried by the tool turret.

4. The machine of claim 1 wherein the slide carrying the workpiece is constructed to be advanced and retracted linearly along an axis which is essentially perpendicular to the axis of rotation of the arbor tool in the work station.

5. The machine of claim 4 wherein each of the arbor tools carried by the tool turret is journalled for rotation and supported on the tool turret so that the axis of rotation of each of the arbor tools is essentially parallel to the axis of rotation of the tool turret and all the arbor tools are spaced apart from one another circumferentially around the tool turret.

6. The machine of claim 5 which also comprises a tool driver slide carried by the base for generally linear movement along an axis essentially parallel to and spaced from the axis of rotation of the tool turret, said second drive is carried by said tool driver slide for movement in unison therewith, and a fourth drive operably connected with said tool driver slide for advancing it to move the coupler of the tool driver into driving engagement with the arbor tool received in the work station and retracting the tool driver slide to disengage the coupler from the arbor tool in the work station.

7. The machine of claim 1 which also comprises a tool driver slide carried by the base for generally linear movement along an axis essentially parallel to the axis of rotation of the arbor tool in the work station, said second driver is carried by said slide for movement in unison therewith, and a fourth drive operably connected with said tool driver slide for advancing it to move the coupler of the tool driver into driving engagement with the arbor tool received in the work station and retracting the tool driver slide to disengage the drive coupler from the arbor tool in the work station.

8. The machine of claim 6 which also comprises a second slide carried by said workpiece slide for lineal movement along an axis essentially parallel to the axis of rotation of the arbor tool in the work station, and for receiving the workpiece thereon, and a fifth drive operably connected with the second slide for advancing and retracting the second slide along its axis essentially parallel to the axis of rotation of the workpiece in the work station for aligning portions of the workpiece with the cutter of the arbor tool in the work station.

9. The machine of claim 1 which also comprises a second slide carried by said workpiece slide for lineal movement along an axis essentially parallel to the axis of rotation of the arbor tool in the work station, and for carrying the workpiece thereon, and a fourth drive operably connected with the second slide for advancing and retracting the second slide along its axis essentially parallel to the axis of rotation of the workpiece in the work station for aligning portions of the workpiece with the cutter of the arbor tool in the work station.

10. The machine of claim 1 which also comprises a mechanism releasably connecting with the tool turret to prevent the tool turret from rotating while an arbor tool carried by the tool turret is machining the workpiece.

11. The machine of claim 1 which also comprises curvic couplings connecting with the turret and releasably engageable to prevent rotation of the turret at least while an arbor tool carried by the turret is machining the workpiece and movable to release the turret so it can be indexed by the first drive to move another arbor tool carried by the turret into the work station for use in machining the same workpiece.

12. The machine of claim 1 which also comprises a first position sensor operably associated with the workpiece slide, a second position sensor operably associated with the tool turret and a computer or a programmable controller utilizing the signals of the said first and second sensors and cycling the first drive, second drive, and third drive for performing at least two machining operations on the same workpiece.

13. The machine of claim 6 which also comprises a first position sensor operably associated with the workpiece slide, a second position sensor operably associated with the tool turret, a third position sensor operably associated with the tool driver slide and a computer or a programmable controller utilizing the signals of the said first, second and third sensors and cycling the first drive, second drive, third drive and fourth drive for performing at least two machining operations on the same workpiece.

14. The machine of claim 7 which also comprises a first position sensor operably associated with the workpiece slide, a second position sensor operably associated with the tool turret, a third position sensor operably associated with the tool driver slide, a fourth position sensor operably associated with the second slide, and a computer or a programmable controller utilizing the signals of the said first, second, third and fourth sensors and cycling the first drive, second drive, third drive and fourth drive for performing at least two machining operations on the same workpiece.

15. The machine of claim 8 which also comprises a first position sensor operably associated with the workpiece slide, a second position sensor operably associated with the tool turret, a third position sensor operably associated with the tool driver slide, a fourth position sensor operably associated with the second slide, and a computer or a programmable controller utilizing the signals of the said first, second, third and fourth sensors and cycling the first drive, second drive, third drive, fourth drive and fifth drive for performing at least two machining operations on the same workpiece.

16. The machine of claim 9 which also comprises a first position sensor operably associated with the workpiece slide, a second position sensor operably associated with the tool turret, a third position sensor operably associated with the tool driver slide, a fourth position sensor operably associated with the second slide, and a computer or a programmable controller utilizing the signals of the said first, second, third and fourth sensors and cycling the first drive, second drive, third drive, and fourth drive for performing at least two machining operations on the same workpiece.

17. The machine of claim 1 which also consists at least two separate supports for an arbor tool each releasably secured to the tool turret, each of said supports having a plurality of bearings for journalling an arbor tool, and all of said bearings being of the same size so that each support can receive and journal one at a time a plurality of different arbor tools.

* * * * *